United States Patent [19]

Warren et al.

[11] E Patent Number: Re. 32,355

[45] Reissued Date of Patent: Feb. 17, 1987

[54] IMPELLER SHOE ASSEMBLY

[75] Inventors: Kenneth D. Warren; Gregory G. Tenold, both of Spokane, Wash.

[73] Assignee: Portec, Inc., Oak Brook, Ill.

[21] Appl. No.: 648,812

[22] Filed: Sep. 7, 1984 (Under 37 CFR 1.47)

Related U.S. Patent Documents

Reissue of:

[64] Patent No.: 4,355,769
Issued: Oct. 26, 1982
Appl. No.: 160,068
Filed: Jun. 16, 1980

[51] Int. Cl.[4] ..... B02C 19/06

[52] U.S. Cl. ..... 241/300; 241/275

[58] Field of Search ..... 241/191, 195, 197, 275, 241/291, 300

[56] References Cited

U.S. PATENT DOCUMENTS

| | | | |
|---|---|---|---|
| 3,074,657 | 1/1963 | Bridgewater . | |
| 3,110,449 | 11/1963 | Bridgewater | 241/197 X |
| 3,474,974 | 10/1969 | Wood . | |
| 3,829,032 | 8/1974 | Schrimper | 241/197 |
| 4,090,673 | 5/1978 | Acker et al. | 241/275 |

*Primary Examiner*—Howard N. Goldberg

*Assistant Examiner*—Timothy V. Eley

*Attorney, Agent, or Firm*—Wells, St. John & Roberts

[57] ABSTRACT

An elongated impeller shoe assembly 10 is described for a vertical shaft centrifugal impact crushing machine 11 for increasing the effective utilization of the assembly and for substantially reducing the cost to utilization ratio. The assembly 10 includes an elongated supporting base member 28 for attaching to a turn-table bracket 20 in which the base member [20] *28* is cast of a high strength steel alloy material. The base member 28 has a wide longitudinal female dovetail groove 54 formed in a front face 38 thereof extending between an inner end 32 and an outer end 34. The groove 54 has a shallow taper downward from the inner end 32 to the outer end 34. The assembly 10 includes a wear resistant member 30 mountable to the base member 28 for receiving the material from a central distribution disc 15 and directs the material radially outward along a front face 82. The wear resistant member 30 has a complementary male dovetail projection 100 formed on a back face for slidably fitting into the female dovetail groove 54 to releasably secure the wear resistant member 30 to the base member 28. The base member 28 and the wear resistant member 30 have respective shoulder and abutment surfaces 48 and 108 for engaging each other to maintain a loose fit between the dovetail elements.

13 Claims, 6 Drawing Figures

IMPELLER SHOE ASSEMBLY

Matter enclosed in heavy brackets [ ] appears in the original patent but forms no part of this reissue specification; matter printed in italics indicates the additions made by reissue.

TECHNICAL FIELD

This invention relates to a vertical shaft centrifugal impact crushing machine and more particularly to impeller shoe assemblies for such machines.

BACKGROUND OF THE INVENTION

In a vertical shaft centrifugal impact crushing machine, particulate material is fed centrally onto a horizontal turntable that is rotating about a vertical axis at a high speed. Impeller shoe assemblies are mounted on the turntable causing the particulate material to accelerate radially outward from the central portion of the turntable to a very high velocity to impact against stationary wear resistant anvil members positioned about the periphery of the turntable. When the material impacts against the stationary wear resistant anvil members the deceleration forces cause the material to break into smaller pieces.

One of the principal problems with the prior art impeller shoes was the poor utilization of the wear resistant material.

One of the principal purposes of this invention is to provide an impeller shoe assembly that greatly increases the efficiency of the impeller shoe with respect to weight and cost. A further object is to provide an impeller shoe assembly in which the amount of unusable wear resistant material is greatly reduced, thereby providing an extended life to cost ratio.

These and other objects and advantages of this invention will become apparent upon reading the following detailed description of a preferred embodiment.

BRIEF DESCRIPTION OF THE DRAWINGS

The preferred embodiment of this invention is illustrated in the accompanying drawings, in which.

DETAILED DESCRIPTION OF A PREFERRED EMBODIMENT

Figure 1:
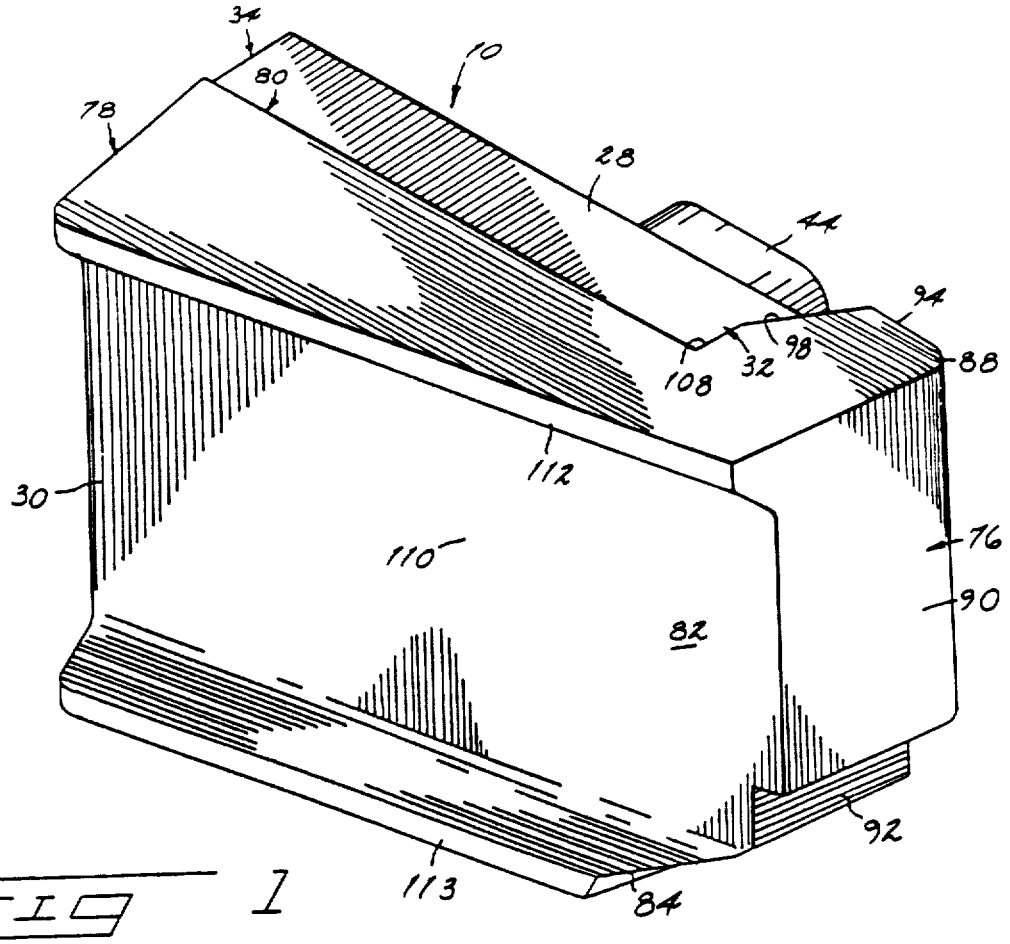
FIG. 1 is an isometric view of an impeller shoe assembly which is the subject of this invention.
Figure 5:
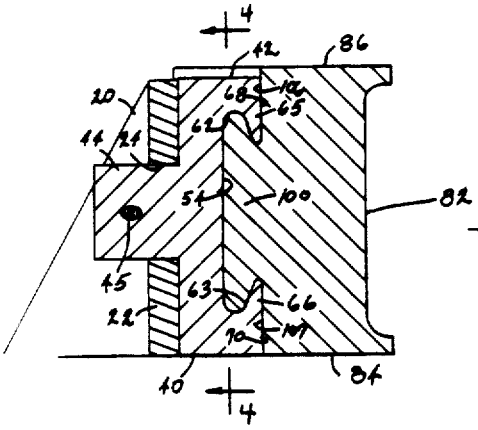
FIG. 5 is a vertical transverse cross-sectional view taken along line 5—5 in FIG. 3.
Figure 6:
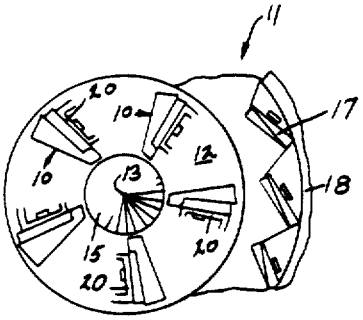
FIG. 6 is a fragmentary plan view of a crushing chamber of a centrifugal impact crushing machine showing the mounting of the impeller shoe on a turntable in the crushing chamber.

Referring now in detail to the drawings, there is illustrated in FIG. 1 an impeller shoe assembly 10 for use in vertical shaft centrifugal impact crushing machine designated with the numeral 11 in FIG. 6. An example of such a machine is illustrated in the D. R. Warren U.S. Pat. No. 3,606,182 granted Sept. 20, 1971. Several of the impeller shoe assemblies are mounted in radial orientations at angularly spaced locations on a turntable assembly 12. The turntable 12 is designed to rotate about a vertical axis 13. The turntable assembly 12 includes a central distribution disc 15 that is adapted to receive the material from an overhead feed and to distribute the material radially outward to the impeller shoe assemblies 10. As the turntable assembly is rotated at a high speed, the material is accelerated radially outward along the impeller shoe assembly 10 in a trajectory to impinge against the faces of stationary peripheral anvils 17. The impeller shoe assemblies are securely mounted to the turntable 12 by shoe brackets 20. Each bracket 20 includes a bracket mounting plate 22 having an aperture 24 formed therein as illustrated in FIG. 5.

Figure 2:
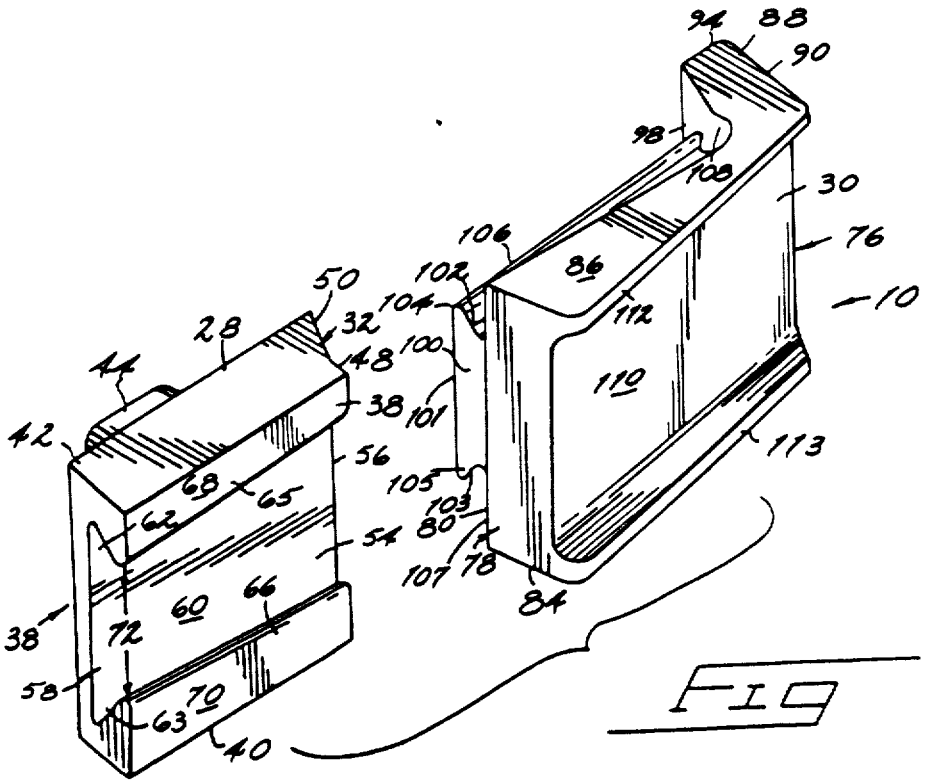
FIG. 2 is an isometric view of members of the assembly being separated to illustrate the mounting technique.

Each of the impeller shoe assemblies 10 includes an elongated supporting base member 28 (FIGS. 1 and 2) for affixing to the bracket plate 22 and an elongated wear resistant member 30 replaceably secured to the base member 28 for receiving and directing the material radially outward to the anvils 17.

Figure 3:
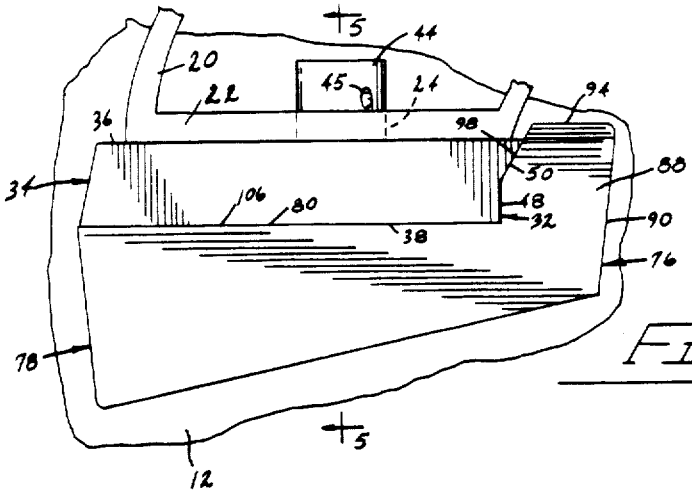
FIG. 3 is a plan view of an impeller shoe assembly mounted to a turntable shoe bracket.

Base member 28 extends from an inclined inner end 32 to an outer end 34 *and* having a backface 36, a front face 38, a bottom face 40 and a top face 42. The bottom face 40 is supported on the turntable assembly 12. The back face 36 has a *securing means such as* stob 44 that extends outwardly therefrom for extending through the aperture 24. The stob 44 includes a diagonal aperture 45 (FIGS. 3 and 5) to receive a removable pin (not shown) to enable the impeller shoe assembly 10 to be removed from the crushing machine.

The inner end 32 includes a shoulder surface 48 and an inclined end surface 50.

The front face 38 includes a wide longitudinal female dovetail groove 54 (FIG. 2) formed therein extending between the inner end 32 and the outer end 34 intermediate the top and bottom faces 40 and 42. The wide female dovetail groove 54 has an opening 56 formed in the inner end 32 and an opening 58 formed in the outer end 34. The dovetail groove 54 is defined by a groove wall 60 and by longitudinal groove recesses 62 and 63 that extend between the inner and outer ends 32 and 34. The recesses 62 and 63 are defined by longitudinal shoulders 65 and 66. The front face 38 includes face bearing surfaces 68 and 70 that provide bearing support for the wear resistant member 30. In a preferred embodiment, the longitudinal female dovetail groove 54 is slightly tapered downward from the inner end 32 to the outer end 34. The minimum width of the groove 54 is identified with the numeral 72 and extends transverse between the longitudinal shoulders 65 and 66.

The width of the groove 72 decreases slightly from the inner end 32 to the outer end 34 to provide the slight taper. It is desirable that the taper not be more than 15° and preferably less than 5°.

The elongated wear resistant member 30 extends from an inner end 76 to an outer end 78 and having a back surface 80, a front surface 82, a bottom surface 84 and a top surface 86. The bottom surface 84 is adapted to rest on the turntable assembly 12. The top face 86 extends elevationally above the top face 42 to further protect the base member 28 from the abrasive action of the material.

The inner end 76 includes an extension or projection 88 (FIGS. 1-3) that extends beyond the back surface 80 for protecting the inner end 32 of the base member and the bracket plate 22. The projection 88 includes an inner face 90 that extends at an inclined angle with respect to the bracket plate 22. Preferably the inclined angle is approximately 9°-11° to cause the material to flow along the [innerface] *inner face* 90 and the front face 82 as it moves radially outward from the distribution disc 15. A disc notch 92 (FIG. 1) is formed at the base of the inner end 76 to accommodate and overlap the central distribution disc 15. The projection 88 includes a side surface 94 for protecting the bracket plate 22 and the inclined surface 98 that is complementary to the inclined end surface 50 of the base member 28.

The back face 80 includes a wide longitudinal male dovetail projection 100 (FIG. 2) that is complementary to the longitudinal female dovetail groove 54. The longitudinal male dovetail projection 100 includes a back surface 101 that is complementary to the groove wall 60. Additionally the projection includes longitudinal recesses 102 and 103 for accommodating the longitudinal shoulders 65 and 66 of the base member 22. The projection 100 includes shoulders 104 and 105 that are accommodated in respective longitudinal groove recesses 62 and 63 of the base member 22.

Figure 4:
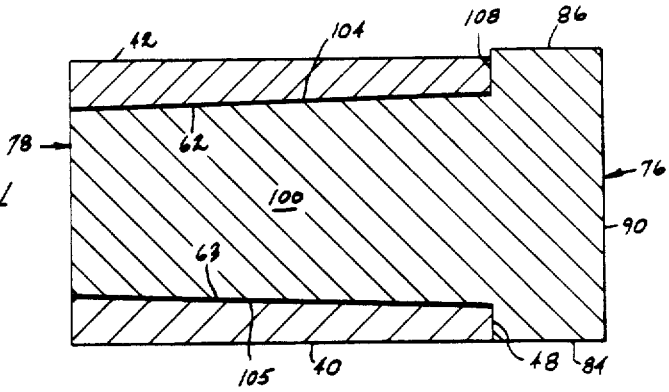
FIG. 4 is a vertical longitudinal cross-sectional view taken along line 4—4 in FIG. [3] *5;*

The male dovetail projection 100 terminates at an abutment surface 108 at the inner end 76 with the abutment surface 108 adapted to engage the shoulder surface 48 to limit the position of the wear resistant member 30 with respect to the base member 28 (FIG. 4).

Backface 80 includes face bearing surfaces 106 and 107 that engage and bear against the respective bearing [surface] *surfaces* 68 and 70 of the base member to provide the supporting bearing surfaces between the base member 28 and the wear resistant member 30 when the impeller shoe assembly is in operation with the turntable assembly 12 rotating at a high angular speed.

The longitudinal male dovetail projection 100 is tapered at a complementary shallow angle to the dovetail groove 54 in which the dovetail projection tapers downwardly from the inner end 76 to the outer end 78. The abutment surface 108 is located with respect to the shoulder surface 48 to longitudinally center the wear resistant member 30 with respect to the base member 28. The abutment surface 108 limits the longitudinal movement of the dovetail projection 100 in the dovetail groove 54 to provide a very loose fit so that the resistant member 30 may be easily removed from the base member 28. In a very abrasive and dusty atmosphere, dust and small particles migrate in between the shoulders 65, 66, 104, 105 and the corresponding recesses 62, 63, 102 and 103. The tapered recess permits the operator to easily replace the wear resistant member 30 by merely tapping the outer end 78. Because of the slight taper, the wear resistant member easily moves radially inward to enable the wear resistant member 30 to be replaced after its useful life.

The front face 82 of the wear resistant member 30 includes a longitudinal channel 110 that is defined by longitudinal flanges 113 and 112 adjacent the bottom face 84 and the top face 86 respectively.

It should be noted that the thickness of the wear resistant member 30 progressively increases from the inner end 76 to the outer end 78 between the back face 80 and the front face 82 to provide a somewhat wedged-shaped wear resistant element. The base member 28 has a substantially uniform thickness from the inner end 32 to the outer end 34 between the back face 34 and the front face 38.

An additional feature includes the provision that the minimum width of the groove designated by the numeral 72 (FIG. 2) is greater than 50% of the distance between the top face 42 and the bottom face 40 and preferably the width 72 is greater than 60% of the distance between the top face 42 and the bottom face 40. The wide dovetail elements increase the depth and width of the wear resistant element to increase the life of the member 30.

The two-piece impeller shoe assembly enables the supporting base member 28 to be constructed of a high-strength high-impact material that minimizes breakage such as 8630 alloy steel, whereas the wear resistant member 30 is constructed of a lower strength but higher wear resistant material such as high chrome iron. The combination of the two provides a superior impeller shoe that is considerably less costly to the customer and provides a much more cost efficient operation with less waste material which substantially reduces the cost of operation. Additionally the high strength base member 28 enables the table assembly to be rotated at a higher angular speed to increase the performance of the machine and produce smaller particles.

It should be understood that the above described embodiment is simply illustrative of the principals of this invention and numerous other inventions may be readily devised without deviating therefrom. Therefore, only the following claims are intended to define this invention.

What is claimed is:

1. An impeller shoe assembly for directing material radially outward from a central distribution disc on a horizontal turntable of a vertical shaft centrifugal impact crushing machine to impact the material against stationary anvils circumscribing the turntable, comprising:

an elongated supporting base member having a bottom face, a top face, a back face and a front face extending from an inner end to an outer end with securing means projecting from the back face to releasably secure the base member to a turntable bracket with the back face engaging the bracket;

an inner end of the base member having a shoulder surface;

said front face of the base member having a longitudinal female dovetail groove formed therein extending from the inner end face towards the outer end face intermediate the bottom face and the top face;

an elongated wear resistant member having a bottom face, a top face, back face and a front face extending from an inner end to an outer end with the front face directing the material therealong radially outward from the central disc to impact against the stationary anvils;

said back face of the wear resistant member having a longitudinal male dovetail projection formed therealong extending from the outer end toward the inner end between the bottom and top faces for interfitting within the complementary dovetail groove to releasably secure the wear resistant member to the supporting base member; and said back face of the wear resistant member having an abutment surface for engaging the shoulder surface to position the wear resistant [element] *member* longitudinally relative to the supporting base member to minimize wear of the supporting base member.

2. The impeller shoe assembly as defined in claim 1 wherein the dovetail groove and the dovetail projection are tapered inward toward their respective outer ends to aid in the separation of the wear resistant member from the supporting base member.

3. The impeller shoe assembly as defined in claim 1 wherein the shoulder surface is formed on the face of the inner end of the supporting base member and wherein the inner end of the wear resistant member includes a projection extending outward beyond the back face to protect the inner end of the supporting base member and to form the abutment surface for engaging the shoulder surface.

4. The impeller shoe assembly as defined in claim 1 wherein the width of the female dovetail groove is greater than 50% of the distance between the top and bottom faces of the base member.

*5. A wear resistant member for use with a supporting base member mounted on a horizontal turntable of a vertical shaft centrifugal impact crushing machine, to impact material against stationary anvils circumscribing the turntable, comprising:*

*a bottom face, top face, back face, and a front face extending from an inner to an outer end with the front face directing the material therealong radially utward from the horizontal turntable to impact against the stationary anvils;*

*said back face of the wear resistant member having a longitudinal male dovetail projection formed therealong extending from the outer end toward the inner end between the bottom and top faces, for interfitting within a complementary dovetail groove formed on a front face of the supporting base member;*

*said back face of the wear resistant member having an abutment surface for engaging a shoulder surface formed on an inner end of the supporting base member, to position the wear resistant member longitudinally relative to the supporting base member.*

*6. The wear resistant member as defined in claim 5 wherein the dovetail projection is tapered inward toward its outer end.*

*7. The wear resistant member as defined in claim 5 wherein the inner end of the wear resistant member includes a projection extending outward beyond the back face to protect an inner end of a supporting base member.*

*8. The wear resistant member as defined in claim 5 wherein the thickness of the wear resistant member between the back face and front face progressively increases from the inner end to the outer end.*

*9. The wear resistant member as defined in claim 5 wherein the front face thereof includes at least one longitudinal flange.*

*10. A supporting base member for mounting a wear resistant member upon a rotatable horizontal turntable of a vertical shaft centrifugal impact crushing machine, comprising:*

*a bottom face, top face, back face and a front face extending from an inner end to an outer end; the front face being longitudinally rectilinear for allowing the wear resistant member to be slidably installed thereon by relative linear sliding therebetween; the front face further having a longitudinal rectilinear female dovetail groove formed therein extending from the inner end towards the outer end intermediate the bottom face and top face;*

*said inner end of the base member having a transverse shoulder surface formed thereon for engaging an abutment surface formed on the wear resistant member; said shoulder surface extending transversely rearward from the rectilinear front face so as to allow engagement with the abutment surface of the wear resistant member transversely of the rectilinear front face to thereby prevent relative sliding movement of the wear resistant member upon the base member from the inner end toward the outer end of the base member during rotation of the turntable; and*

*securing means attached to the base member to releasably secure the base member to the turntable.*

*11. The supporting base member as defined in claim 10 wherein the dovetail groove is tapered inwardly toward the outer end for receiving a similarly tapered male dovetail projection extending from the wear resistant member, the dovetail groove being sized to receive the male dovetail projection in loosely fitting engagement when the transverse shoulder engages the abutment surface of the wear resistant member mounted thereon.*

*12. The supporting base member as defined in claim 10 wherein the width of the female dovetail groove is greater than 50% of the distance between the top and bottom faces of the base member.*

*13. The supporting base member as defined in claim 10 wherein the end face is further defined by an inclined end surface extending rearwardly from the transverse shoulder surface at an oblique angle with respect thereto, and intersecting the rear face.*

* * * * *